United States Patent Office 3,422,414
Patented Jan. 14, 1969

3,422,414
SYSTEM FOR CHECKING THE OPERATIONAL RELIABILITY OF LOGIC MODULES AND FINDING THE LOCALITY OF FAULTS
Hermann Margreiter, Erlangen, Germany, assignor to Siemens Aktiengesellschaft, Erlangen, Germany, a corporation of Germany
Filed July 8, 1965, Ser. No. 470,553
Claims priority, application Germany, July 10, 1964, S 91,979
U.S. Cl. 340—214　　　　　　　　　　　　　3 Claims
Int. Cl. G08b 29/00; H03k 5/18

My invention relates to systems for continuously checking the operational relability of logic modules or building blocks, particularly those of the contactless or solid-state type, as employed for signal and data processing, for example in the control of machine tools and other fabricating machinery or in computer equipment.

Signal processing with static logic modules and hence without the use of mechanically moving contacts affords an increased reliability of operation because faulty switching operations due to sticking or bouncing of mechanical contacts are avoided, greatly minimizes any occurring wear, and permits operating at higher speed so that a much larger number of signals can be processed with unit time. However, since the solid-state components of the logic modules are equipped with semiconductor devices, care must be taken to avoid electrical or thermal overloads. Such overloads may occur if the working temperature rises above a given range, or if the feeder voltages or the voltages of the control signals required for the semiconductor devices are too high. The solid-state components, despite their superiority in other respects, are particularly sensitive to over-voltage peaks, as may occur for example when a direct-current circuit containing an inductivity is switched off by a solid-state power stage such as a power transistor or thyristor.

Systems of solid-state modules for the control of machinery require the use of input members, for example control switches, position-responsive devices and various types of sensors which enter the primary control signals or commands into the control system. Connected to these input members is the control portion of the solid-state modular system proper. It serves for evaluating and processing the control signals, providing any necessary interlocking and interlinking operations in accordance with the particular logic conditions required, and secures the desired time course of the control program. Connected to the control system proper are the output members, which may be constituted by contactors, solenoid valves, clutches and other devices. The electrical power required for controlling the output members is made available by interposition of amplifying stages likewise equipped with solid-state components, usually transistors, and rated for the large power output required.

Since the signal voltages for controlling the individual building blocks or modules of such a logic system, as well as the feeder voltages for the solid-state components, are constituted by direct voltages, and since the output or load members controlled from the modules through power stages have often an inductive internal impedance, there exists the danger that the high voltage peaks occurring at the inductive loads will damage or destroy the transistors in the power amplifying stages of the system. To prevent such damage, it has been attempted to reduce the voltage peaks resulting from interrupting operations, by connecting diodes or RC members in shunt with the inductive loads. This, however, does not eliminate the danger that one or the other solid-state modules—not only in the power amplifying stages—may become defective by overstressing the semiconductor component employed, so that a satisfactory performance of the entire control chain of modules may be no longer secured.

To be sure, there is the possibility of substituting a new component for a defective component from case to case. However, some faults occurring in such a control system have consequences which, aside from production outages, also result in damage to the products being manufactured or in injury to the attending personnel. That is, outages and deficiencies of the kind mentioned may be classified in two groups, namely in non-hazardous control failures without danger to personnel, for example if a danger indicating system will respond although no danger exists, and hazardous faults, for example when the plunger of a rapidly operating punch press suddenly starts operating while the press is still being set up for operation. Control systems in which the failure of any one module may result in accident must in any event be protected from such occurrences.

It is an object of my invention, therefore, to provide solid-state modular control systems with means for continuous supervision and continual checking and locating of possible faults, particularly for use with machine tools and other fabricating machinery in which failure of a module or modular group in the system poses a danger to personnel or my cause considerable damage; and it is a correlated object of the invention to provide the assurance that any such fault within the control system has the effect of immediately preventing further machine operations.

It has been proposed to check the operational reliability of individual or mutually interlinked logic modules (building blocks) of a control system by means of a checking device which comprises a pulse transmitter and a pulse receiver, the transmitter operating to divide the control signals (L-signals and O-signals) into mutually complementary signal sequences so that the L-signal state is constituted by an $L_O$-sequence (namely an L-signal with short periodic O-signal interpositions), and the O-signal state is constituted by a corresponding $O_L$-sequence (O-signal with short L-signal interpositions). The receiver of the checking device is equipped with an $L_O$-test gate and an $O_L$-test gate whose respective inputs are connected with the outputs (and if necessary also with the inputs) of the logic modules being checked. Connected to the outputs of the $L_O$- and $O_L$-gates is a switching device which is released to initiate or produce the desired protection if falsely one of the $L_O$-gate inputs receives an L-signal or one of the $O_L$-gate inputs receives an O-signal.

Despite the advantages of such a continuously checked control system, its use in practice has encountered considerable difficulties. Since, as a rule, the ultimate users of such systems often lack personnel of the particular skill required, it is to be expected that in the event of disturbances, and although the above-described system may operate properly, a considerable production outage will be inevitable because of the time lost in first pinpointing the fault within the complex control system and then eliminating the defect responded to.

It is, therefore, a more specific object of my invention to devise a continuous checking system for modular logic controls which also affords checking the system so that any occurring fault can be located or more or less pin-pointed and indicated, thus affording a replacement of any defective logic module or component without requiring particularly high skill or knowledge of system details.

To this end and in accordance with a feature of my invention, I provide a control system composed of logic modules and operating with binary L-signals and O-signals in such manner and by such means as briefly described above, with a test circuit which together with the transmitter portion and the receiver portion of the continuously operating checking device is connected to the logic modules or module group to be tested and with comprises O-signal supply means, L-signal supply means as well as selective test switches for applying the O-signals to the above-mentioned $L_O$-gate and for applying the L-signals to the above-mentioned $O_L$-gate. This affords the particular module, component or modular group of the system in which a fault has occurred, to be located in a simple manner, namely by sequentially setting the selector switches to different settings.

According to another feature of my invention, it is preferable to pass the $L_O$-signals onto an OR-gate and the $O_L$-signals onto an active AND-gate, the output of the OR-gate being connected with the set input of a memory, and the output of the AND-gate being connected with the reset input of the memory, the reset output of the memory being connected to the above-mentioned protective switching device. In this manner the further processing of the signals furnished from the test gates can be effected through a single channel.

It is further preferable, according to another feature of my invention, to connect the set input of the memory in feedback relation to an input of the AND-gate. This has the result that the memory is likewise included in the supervisory checking performance.

The above-mentioned and further objects, advantages and features of my invention, said features being set forth with particularity in the claims annexed hereto, will be apparent from, and will be described in, the following with reference to the accompanying drawings illustrating by way of example an embodiment of a self-checking control system according to the invention.

Figure 1:
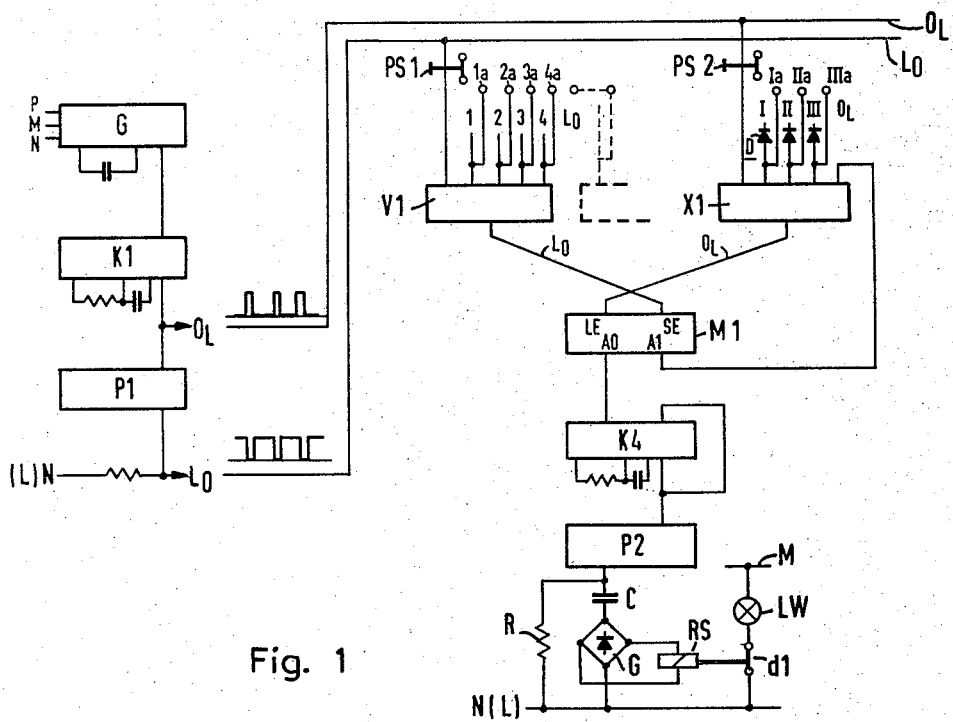
FIG. 1 shows schematically a circuit diagram of the checking fault-locating portion of the system.
Figure 2:
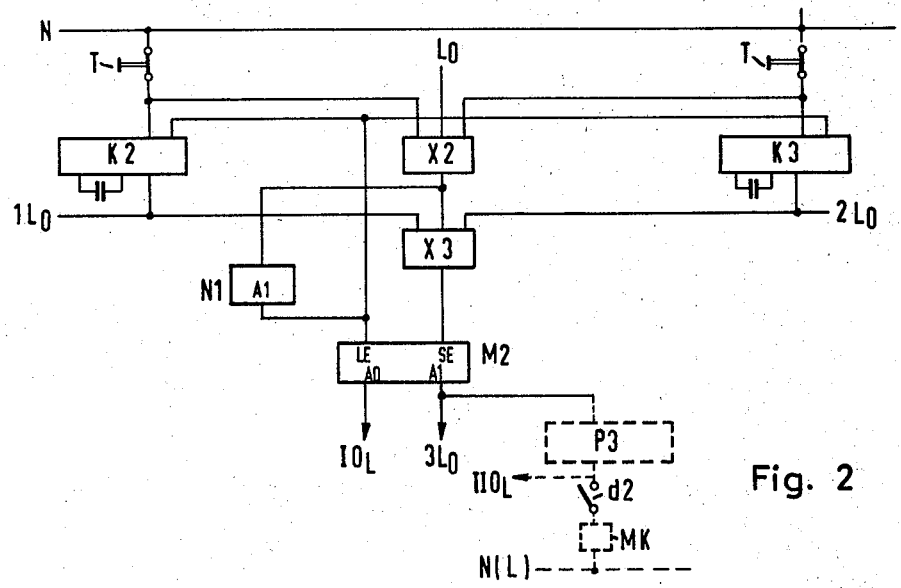
FIG. 2 is a schematic circuit diagram of a control system for a punch press controlled and supervised by the system portion shown in FIG. 1.
Figure 4:
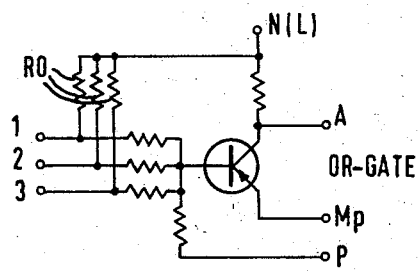
Figure 5:
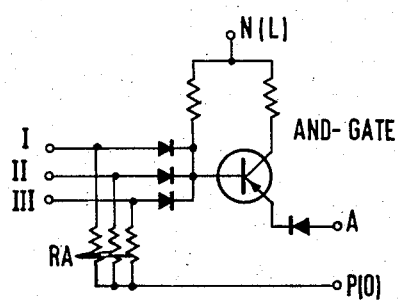

FIG. 4 exemplifies the internal circuitry of an OR-gate applicable in the system portion of FIG. 1; and FIG. 5 shows as an example of internal circuitry for an AND-gate as used in the system of FIGS. 1 and 2.

According to the dynamic checking principle upon which the present invention is predicated, the modules to be continuously supervised are connected in summing circuitry in which they are continuously checked for functional reliability. Such summing circuitry is embodied in the checking and fault-locating system portion shown in FIG. 1.

A continuous pulse sequence is furnished from a pulse transmitter G consisting of a suitable oscillator and furnishing, for example, a signal frequency of 5 kc. The pulse sequence is converted by a flip-flop stage K1 into an $O_L$-signal sequence, namely an O-signal with short L-signal interpositions, such a sequence being graphically represented at $O_L$ in FIG. 3. The interposed short L-portions of the pulse are equidistant, the time characteristic being dependent upon the chosen parameters of the resistance-capacitance combination in flip-flop stage K1.

Figure 3:
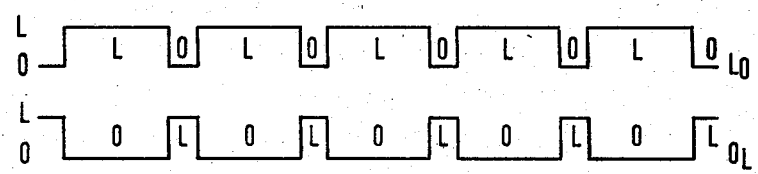
FIG. 3 is explanatory and represents time diagrams of $L_O$- and $O_L$-signal sequences as used in the system of FIGS. 1 and 2.

The resulting $O_L$-signal sequence is passed through a power amplifying stage P1 which also acts as an inverter, so that the output of P1 furnishes a complementary $L_O$-signal sequence, consisting of an L-signal with short L-signal interpositions as graphically represented at $L_O$ in FIG. 3. During the short interval of time in which the $L_O$-signal sequence possesses an L-portion, the O-signal simultaneously exhibits it O-portion, and vice vera.

The L-O sequence is supplied through a connecting line, also denoted by $O_L$ in FIG. 1, to a compensated OR-gate V1 (FIGS. 1, 4). Although only one OR-gate V1 is shown, any desired additional number of such OR-gates may be connected in parallel to the line $O_L$ as is indicated by a fragmentary broken-line representation in FIG. 1.

Simultaneously the $O_L$-signal sequence is supplied through a line, designated by $L_O$, to an active AND-gate X1.

A suitable compensated OR-gate V1 is shown in FIG. 4. Respective resistors RO are connected between the negative pole N of the feed voltage and the inputs 1, 2, 3, etc. The terminal A furnishes the output pulse and the terminal $Mp$ is to be connected to the mid-potential between the potential of feed voltage terminals P and N. If any one of the wires connected to terminals 1, 2, 3 breaks, a continuous negative L-signal is supplied from terminal N through the corresponding resistor RO so that a continuous L-signal appears at the output terminal A, regardless of the signal condition of the other input terminals.

Circuit details of a suitable compensated (active) AND-gate (X1, X2, X3 in FIGS. 1, 2) are exemplified in FIG. 5. Resistors RA are connected between the positive pole of the feeder voltage and respective inputs I, II, III etc. If any one of the wires connected to the inputs I, II, III is interrupted, the positive potential is reliably applied to the corresponding input of the gate so that a continuous O-signal appears at the output terminal A, regardless of the signals received by the other inputs.

The signals sequences $O_L$ and $L_O$ supplied to the test gates V1 and X1 (FIG. 1) are also supplied to the inputs of the modular system components (shown in FIG. 2 and described hereinbelow) to the kept under continuous supervision. Depending upon the particular output signal being supervised, the outputs of the supervised system components are connected to the inputs 1, 2, 3 etc. of the OR-gate V1 (constituting the $L_O$-test gate), or through respective diodes D to the inputs I, II, III etc. of the AND-gate X1 (constituting the $O_L$-test gate).

As long as the modular components connected to the $L_O$-gate V1 furnish an $L_O$-signal (indicating the active condition) or continuously furnish the O-signal (corresponding to the idle condition of the control system), the control system being supervised is in reliable operating condition; but as soon as a continuous L-signal is furnished, the operability is dangerously defective. Analogously, as long as the modular components connected to the $O_L$-gate X1 furnish the $O_L$-signal or a contiuous L-signal (corresponding to the idle condition), the control system is undisturbed; but the occurrence of a continuous O-signal indicates the existence of a dangerous fault.

It will be recognized that when the entire modular control system is in idle condition, all of the modular components connected to the $L_O$-test gate V1 furnish the O-signal; that is, the O-signal is now applied to all of the inputs 1, 2, 3 etc. of the OR-gate V1. Consequently, the $L_O$-signal simultaneously supplied from the line $L_O$ to the same gate V1 passes through and appears in the output of the OR-gate, as is indicated in FIG. 1. Analogously in the idle condition of the system being supervised, all of the modular components connected to the $O_L$-gate X1 supply L-signals so that the coincidence condition for the AND-gate X1 is satisfied only at the moment in which the controlling $O_L$-signal possesses a short-lasting L-signal interposition. Consequently at the output of the AND-gate X1 there also appears the $O_L$-signal.

The output of the OR-gate V1 is connected with the set input SE of a memory M1, and the output of the AND-gate X1 is connected with the reset or clearing input LE of the memory M1.

The memory M1, such as a bistable flip-flop is set by the L-signal of the $L_O$-sequence, that is the L-signal appears at the output A1 of memory M1 and the O-signal appears at the output AO of the memory. When the L-signal portion of the $L_O$-sequence at the set input SE is terminated, the memory is reset by the short L-signal interposed in the $O_L$-sequence appearing at the reset input LE. Consequently, at the reset output AO there now appears the L-signal, and the L-signal vanishes at the set output A1. The now reoccurring L-signal in the $L_O$-sequence again sets the memory M1, and the short L-signal interposition in the $O_L$-sequence again clears the memory. This periodic operation is continuously repeated at the pulse frequency. As a result, there appears an $O_L$-signal sequence at the reset output AO of memory M1, and an $L_O$-signal sequence appears at the set output A1 of memory M1.

For including the memory M1 in the continuous supervision of operational reliability, the $L_O$-signal sequence appearing at the memory output A1 is feedback-connected with the AND-gate X1. Thus the memory M1 is connected with the AND-gate X1 in the same manner as any of the modular components in the control system being supervised by the equipment shown in FIG. 1.

The reset output AO of the memory M1 is connected with the input of a monostable timing flip-flop K4 whose time constants are so rated that the $O_L$-sequence supplied to the input is converted to a pulse sequence having a symmetrical pulse ratio, this symmetrical pulse sequence appearing at the output of the flip-flop K4.

The output of flip-flop K4 is connected to a power amplifier stage P2 which charges a capacitor C connected to the N-potential (identical with the signal-L potential). The output of the power stage P2 is further connected through a resistor 1R with the N-potential, so that the resistor 1R operates as a discharge resistance for the capacitor C.

The power stage P2 is transistorized. When it receives the L-signal from the flip-flop K4, the end transistor in the power stage P2 is turned on, and a charging current flows through the capacitor C. When the O-signal appears at the output of flip-flop K4, the power transistor is turned off, and the capacitor C discharges through the resistor 1R. The charging and discharging current passing through the capacitor is an alternating current which is rectified by a rectifier G1. As long as the flip-flop K4 furnishes a signal sequence, a protective relay RS connected to the rectifier G1 remains picked up so that the relay contact d1 is open and an optical warning signal LW is switched off. Under the same, normal operating conditions, a second contact d2 (FIG. 2) of relay RS is closed and permits the supply of electric current to the machinery or other load being controlled, for example the supply of electric current to a magnetic clutch MK for operation of the punch press, as will be more fully described in a later place.

During normal operation, the modular components connected to the respective inputs of the $L_O$-gate V1 supply $L_O$-signals which do not result in any change relative to the main $L_O$-signal supplied from the transmitter through line $L_O$. However, if any one of these modular components suffers a defect apt to cause dangerous failure of the control performance, this modular component issues a continuous L-signal to the OR-gate V1. Consequently a continuous L-signal now appears at the output of gate V1. This causes the $O_L$-signal sequence to vanish from th eoutput AO of the memory M1 so that the flip-flop K4 receives no control signal and the protective relay RS drops off. The same takes place in the event of wire breakage in the supply leads of the OR-gate V1 because then one of the compensating resistors RO in the OR-gate (FIG. 4) becomes effective to issue a continuous L-signal from the gate.

The closing of contact d1 when relay RS drops off causes the optical warning device LW to issue a signal to be observed by the attending personnel. Simultaneously the relay contact d2 (FIG. 2) opens and disconnects the magnetic clutch MK or other electrical equipment from the current supply to prevent or stop the operation of machinery.

Upon such response to the occurrence of fault in the system being supervised, it is necessary to locate the particular modular component or sub-assembly that has become defective. The following means and operations serve this purpose.

The $L_O$-test gate V1 has each of its check inputs I, II, III . . . provided with a branch input $1a$, $2a$, $3a$ . . . which are connected to the bank contacts of a selector switch PS1 whose selector contact is in connection with a supply M of O-potential. Analogously the $O_L$-test gate has its check inputs connected with tap inputs $Ia$, $IIa$, $IIIa$ . . . attached to the bank contacts of a second selector switch PS2 whose selector contact is attached to a supply N of signal-L (negative) potential.

After the supervisory system has responded to the occurence of fault, the test switch PS1 is actuated by an attendant to sequentially place the O-signal (positive potential) upon the inputs $Ia$, $IIa$, $IIIa$ and so forth of the OR-gate V1. The O-signal renders the continuous L-signal, coming from the disturbed modular component, ineffective so that the relay RS will again pick up and cause the lamp or other warning signal LW to extinguish. The position then occupied by the test switch PS1 is indicative of the modular component or group in which the fault has occurred.

The fault-locating operation for $O_L$-supervision is analogous. In normal operation the modules connected to the $O_L$-gate X1 exhibit the $O_L$-signal at their respective outputs so that no change occurs in the gate X1. If any of the components becomes dangerously defective, it furnishes a continuous O-signal to the gate X1 so that the coincidence condition for the AND-gate X1 is no longer satisfied. Consequently a continuous O-signal now appears at the output of gate X1 and causes the relay RS to drop off. The fault location is then ascertained by switching the test switch PS2 sequentially upon the inputs $Ia$, $IIa$ and so forth to apply a continuous L-signal (which indicates the idle condition). This L-signal satisfies the AND-test condition of the gate X1 because the continuous O-signal of the defective modular component is blocked off by one of the diodes D. From the change in the condition of the warning signal LW and the simultaneous position of the test switch PS2, the particular modular component or group of components in which the defect has occurred will now be apparent.

It will be understood, therefore, that by coaction of the dynamic supervision with the fault-locating means described in the foregoing, it is readily possible to recognize not only the occurrence but also the locality of dangerous defects in control or data processing systems as may result, for example, from damage to a transistor or breaking of a wire.

The fault-locating performance will be more fully apparent from the following description of the example of a machine-tool control system shown in FIG. 2. The illustration relates to the control of a punch press whose plunger is set into operation by energizing a magnetic clutch MK. This requires the operator to use both hands for simultaneously depressing two mutually spaced keys or pushbuttons T.

The system comprises two flip-flop stages K2 and K3, two active AND-gates X2 and X3 which may correspond to FIG. 5, an inverter stage N1, and a 2-bit memory M2, such as a bistable flip-flop. In the idle condition, with both keys T open as illustrated, the output of the AND-gate X2 supplies the O-signal which is converted by the inverter N1 to appear as a continuous L-signal at the reset input LE of the memory M2. Thus the memory M2 is continuously cleared, and its output A1 continuously furnishes the O-signal. This output A1 is connected with a power amplifier stage P3 to whose output the magnet clutch MK is connected under control by the contact d2 of the above-mentioned protective relay RS (FIG. 1). It will be understood that, while a direct control by contact d2 is shown for simplicity, any desired contactor circuit may be interposed, or the control may be entirely by means of solid-state components. As long as the O-signal at the output A1 of memory M2 persists, the output of the power stage P3, which also acts as an inverter, continuously supplies the L-signal whose potential is in accordance with the negative potential of the feeder voltage supply line N. Consequently the magnetic clutch MK is normally not energized although the contact $d2$ is normally closed because the relay RS, as explained above, is energized under normal operating conditions.

When now the two keys T are both depressed, the coincidence conditions for the AND-gates X2 and X3 are met, and the outputs of both gates exhibit the $L_O$-signal. This supplies through inverter N1 the $O_L$-signal to the reset input LE of memory M2, whereas the $L_O$-signal appears at the set input SE. Analogously, the output AO of memory M2 furnishes an $O_L$-signal sequence, and the output A1 an $L_O$-signal sequence. This produces an $O_L$-signal sequence at the output of the power stage P3. The magnetic clutch MK, previously receiving a continuous L-signal (idle condition), now receives an $O_L$-sequence in which the share of the O-signal is preponderant so that the clutch MK is actuated and the machine operation initiated. The short L-signal interruptions contained in the $O_L$-signal do not suffice to cause drop-out of the clutch because of the time constant (magnetic inertia) of the clutch MK.

Depending upon the particular output signal to be continuously supervised, the outputs of the individual modular components in the system just described are connected to the respective inputs of the test gates V1 and X1 shown in FIG. 1. The designations $1L_O$, $2L_O$, $3L_O$ in FIG. 2 denote that the so designated module outputs are connected with the respective inputs 1, 2, 3 of the OR-gate V1. Analogously, the designations $IO_L$, $IIO_L$ indicate that the respective module outputs are connected with the inputs I, II of the AND-gate X1. As long as the modular components thus connected with the $L_O$ test gate V1 furnish $L_O$-signals or O-signals, and as long as the module outputs connected to the $O_L$-test gate X1 furnish $O_L$-signals or L-signals, the system is in reliable operating condition.

It may be mentioned that the flip-flops K2 and K3, consisting for example essentially of monostable networks, are supplied with an $O_L$-signal sequence (from line $O_L$ in FIG. 1) in such a connection that when the keys T are being actuated the signal appearing at the respective outputs of the flip-flops K2, K3 is an $L_O$-signal.

Assume that the module X3 is so defective as to be potentially dangerous. This module will now exhibit a continuous L-signal at its output. Hence the set input SE of the memory M2 would be continuously supplied with an L-signal so that the output A1 of the memory would continuously supply the L-signal and the output AO continuously the O-signal. Since the output AO is connected to the $O_L$-test gate X1 (FIG. 1) which sets the condition that the gate output may carry an L-signal but not an O-signal, the $O_L$-supervision will respond. Consequently, the protective relay RS (FIG. 1) will drop off, open its contact $d2$ (FIG. 2) and interrupt the supply of current to the magnetic clutch MK. Now the $O_L$-test switch PS (FIG. 1) is shifted or rotated to the position IA, this being done for example manually by an attendant. This will reestablish the original condition of the $O_L$-supervision because the output AO of the memory M2 is connected to the input I of the AND-gate X1. The position of switch PS2 at I$a$ now is indicative of the general locality of the fault. The consequence to be drawn from this particular switch position, however, is that the defect may have occurred either in the AND-gate X3 or in the memory M2. Consequently, this test results in determining the particular modular group in which a defective condition has occurred. For further locating the individual component or module, a further comparison of the input and output signals by means of measuring instruments is necessary.

Now assume, for example, that a faulty signal is furnished from the output A1 of the memory M2. This would primarily be indicative of a disturbance of the memory output A1. However, if it is found that this output is not disturbed, then the fault must be located either in the inverter N1 or in the AND-gate X3.

If desired, of course, the outputs of the AND-gates and of the inverter stage may be separately supervised and tested with the aid of further supervisory leads, in which case the fault-locating system according to the invention will directly indicate the particular module involved. The pin-pointing can thus be driven to any desired extent, being limited in practice only by economical considerations. As far as the power stage P3 is concerned, a fault can be located in any event. If the output of the power stage exhibits a faulty signal and the output A1 of the memory M2 a correct signal, then the fault can be located only in the power stage P3.

As a rule, it is sufficient to give the supervisory and fault-locating system only an extent as apparent from FIG. 2 because this will take care of operational reliability and protection from injury to personnel. While, as mentioned, it is possible to further trace a fault within a modular group by checking its individual components, it is often more economical to simply substitute the entire module or modular group.

It will be understood by those skilled in the art that the modular components such as those denoted by G, K1–K4, P1–P3, as well as the various gates and memories constitute logic elements which are known as such in various types and are available in the trade as modular units. In this respect reference may be had, for example, to the modular components available under the trademark Simatic from the assignee of the present invention and described in various publications, such as by W. Whitebrecht and G. Sinn, "Construction of the Simatic-System," published in the German periodical Siemens-Zeitschrift of October 1959, pages 598 to 606.

To those skilled in the art it will further be obvious upon a study of this disclosure that my invention permits of a great variety of modifications and hence may be given embodiments other than particularly illustrated and described herein, without departing from the essential features of my invention and within the scope of the claims annexed hereto.

I claim:

1. With a control system having interlinked logic modules controlled by binary L- and O-signals, the combination of a supervisory system for continuously checking the operational reliability of modules and locating any occurring faults, comprising a pulse transmitter portion, a receiver portion and test circuit means, said modules to be checked having respective inputs connected to said transmitter portion to receive control signals therefrom, said transmitter portion having means for dividing the control signals into mutually complementary signal sequences in which the L-signal is constituted by an $L_O$-sequence, which is an L-signal with short periodic O-signal interruptions, and the O-signal by an $O_L$-sequence, which is an O-signal with short L-signal interruptions, said receiver portion comprising protective control means, an $L_O$-signal gate and an $O_L$-signal gate, said gates having inputs connected to said modules being checked to receive output signals therefrom, and said gates having respective outputs connected to said control means for causing protective operation thereof when said $L_O$-gate receives an L-signal or said $O_L$-gate receives an O-signal said test circuit means comprising O-signal and L-signal supply means, and selective test switch means for applying O-signals from said supply means to said respective module-connected inputs of said $L_O$-gate and applying L-signals from said supply means to said module-connected inputs of said $O_L$-gate, whereby upon response of said control means to fault the setting of said switch means at which such response ceases is indicative of the fault location.

2. In a supervisory system according to claim 1, said $L_O$-gate being an OR-gate, said $O_L$-gate being an active AND-gate, a 2-bit memory having a set input connected with the output of said OR-gate and a reset input connected with the output of said AND-gate, said memory having a reset output connected to said protective control means.

3. In a supervisory system according to claim 2, said memory having a set output, and said AND-gate having another input connected to said set output of said memory.

No references cited.

THOMAS B. HABECKER, *Primary Examiner.*

U.S. Cl. X.R.

328—120